(12) United States Patent
Izuki

(10) Patent No.: US 7,541,302 B2
(45) Date of Patent: Jun. 2, 2009

(54) OPTICAL GLASS AND OPTICAL ELEMENT

(75) Inventor: Manabu Izuki, Kobe (JP)

(73) Assignee: Konica Minolta Opto, Inc., Tokyo (JP)

( * ) Notice: Subject to any disclaimer, the term of this patent is extended or adjusted under 35 U.S.C. 154(b) by 696 days.

(21) Appl. No.: 11/104,788

(22) Filed: Apr. 13, 2005

(65) Prior Publication Data

US 2005/0233890 A1 Oct. 20, 2005

(30) Foreign Application Priority Data

Apr. 19, 2004 (JP) ............................. 2004-122390

(51) Int. Cl.
*C03C 3/064* (2006.01)
*C03C 3/091* (2006.01)

(52) U.S. Cl. .......................................... 501/77; 501/66

(58) Field of Classification Search .................... 501/66, 501/77

See application file for complete search history.

(56) References Cited

U.S. PATENT DOCUMENTS

| 4,812,423 A * | 3/1989 | Kodama et al. ............... 501/55 |
| 5,744,409 A | 4/1998 | Hashimoto et al. |
| 5,919,718 A | 7/1999 | Hirota et al. |
| 7,166,549 B2 * | 1/2007 | Fechner et al. ................ 501/56 |
| 7,351,675 B2 * | 4/2008 | Kasuga et al. ................. 501/78 |
| 2005/0113241 A1 * | 5/2005 | Yamamoto et al. ............ 501/67 |

FOREIGN PATENT DOCUMENTS

| JP | 60-036348 | | 2/1985 |
| JP | 60-122747 | | 7/1985 |
| JP | 60221338 A | * | 11/1985 |
| JP | 2000-302479 | | 10/2000 |
| JP | 2003-089543 | | 3/2003 |

OTHER PUBLICATIONS

Derwent Abstract 1985-319327, English abstract of JP 60-221338 A, Nov. 6, 1985.*

* cited by examiner

*Primary Examiner*—Karl E Group
*Assistant Examiner*—Elizabeth A Bolden
(74) *Attorney, Agent, or Firm*—Brinks Hofer Gilson & Lione

(57) ABSTRACT

Optical glass which is suitable for press molding does not substantially contain a compound of lead or arsenic, and has intermediate refractive index, low dispersion properties, low Tg and small density. Concretely, the optical glass includes the glass components of $SiO_2$: 20 to 45%, $B_2O_3$: 15 to 40%, $Al_2O_3$: 4 to 15%, MgO: 0 to 10% (including 0), CaO: 13 to 25%, MgO+CaO: 13 to 25%, $Li_2O$: 12.5 to 25%, $Na_2O$: 0 to 10% (including 0), $K_2O$: 0 to 10% (including 0), $Li_2O$+$Na_2O$+$K_2O$: 12.5 to 25%, SrO: 0 to 10% (including 0), BaO: 0 to 5% (including 0), and $Sb_2O_3$: 0 to 1% (including 0).

28 Claims, 1 Drawing Sheet

OPTICAL GLASS AND OPTICAL ELEMENT

The present application claims priority to Japanese Patent Application No. 2004-122390 filed in Apr. 19, 2004, the entire contents of which are hereby incorporated by reference.

BACKGROUND OF THE INVENTION

1. Field of the Invention

The present invention relates to optical glass and an optical element composed of the optical glass. More concretely, the invention relates to the optical glass suitable for press molding and the optical element composed of the optical glass.

2. Description of the Related Art

In recent years, information recording media such as DVD are widely spreading. It is eagerly desired in the market to drive pick-up lenses for reading information from the information recording media at a high speed in response to the high density of the information recording media. In order to heighten the driving speed of the pick-up lenses, it is necessary to reduce the density of optical glass to be used for the pick-up lenses. Various optical glass having small densities are conventionally proposed (For example, Japanese Patent Application Laid-Open Nos. 60-36348(1985) and 60-122747 (1985)).

On the other hand, as a method of manufacturing a glass lens, a so-called press molding method is known. In this press molding method, glass which is heated to a deformation temperature (hereinafter, "At") or higher is pressed by using a heated molding die composed of a pair of an upper die and a lower die, and lens is directly molded. This press molding method has a-smaller number of manufacturing steps than that of a conventional lens molding method of polishing glass, and thus lenses can be manufactured inexpensively for a short time. For this reason, this method is widely used as a method of manufacturing optical elements such as glass lenses in recent years.

The press molding method can be roughly divided into a reheating method and a direct press method. In the reheating method, after a gob preform or a polished preform having approximately the same shape as that of an end product is formed, the preform is again heated to a temperature not less than a softening point and is press-molded by the heated paired upper and lower dies so as to have the shape of the end product. On the other hand, in the direct press method, a molten glass drop is dropped directly onto a heated die from a glass melting furnace and is press-molded so as to have a shape of an end product. In the both press molding methods, when glass is molded, it is necessary to heat a press die to a temperature which is in the vicinity of or not less than a glass transition temperature (hereinafter, "Tg"). For this reason, as Tg of the glass is higher, the surface oxidization and a change in the metal composition of the press die occur more easily, and the life of the die becomes short, thereby causing a rise in a produce cost. When the glass is formed under an atmosphere of inactive gas such as nitrogen, deterioration of the die can be suppressed. A molding device, however, becomes complicated in order to control the atmosphere, and a running cost of the inactive gas is required, thereby increasing the produce cost. Glass whose Tg is as low as possible is, therefore, desirable as the glass to be used for the press molding methods. Further, it is desirable that the deformation temperature (At) is low similarly to Tg.

In recent years, however, people are starting to worry about the bad effects of a lead compound conventionally used to reduce Tg on the human body. For this reason, disuse of the lead compound is requested in the market. Various technologies that reduce Tg and At of glass without using the lead compound, therefore, are examined and proposed (for example, U.S. Pat. Nos. 5,744,409 and 5,919,718, Japanese Patent Application Laid-Open Nos. 2000-302479 and 2003-89543).

Although the optical glass disclosed in Japanese Patent Application Laid-Open Nos. 60-36348 (1985) and 60-122747 (1985) have a comparatively small density, their glass transition temperature is high, and thus the optical glass is not suitable for the press molding. On the contrary, the optical glass disclosed in U.S. Pat. Nos. 5,744,409 and 5,919,718, and Japanese Patent Application Laid-Open Nos. 2000-302479 and 2003-89543 has a comparatively low glass transition temperature, and thus is suitable for the press molding, but the density is large.

SUMMARY OF THE INVENTION

It is a main object of the present invention to provide optical glass which has low Tg, excellent devitrification resistance and a small density, and is suitable for press molding.

It is another object of the present invention to provide an optical element which has a predetermined optical constant, does not substantially contain a compound of lead or arsenic, and has a small density and high productivity.

The inventors of the present invention devoted themselves to studies in order to achieve the above objects. As a result, they found that when many amount of $Li_2O$ and $CaO$ are added to a $SiO_2$-$B_2O_3$ based glass composition, Tg and density can be reduced. In such a manner, the present invention is devised.

That is to say, from a certain aspect of the present invention, optical glass includes the following components:

$SiO_2$: 20 to 45%;
$B_2O_3$: 15 to 40%;
$Al_2O_3$: 4 to 15%;
MgO: 0 to 10% (including 0);
CaO: 13 to 25%;
MgO+CaO: 13 to 25%;
$Li_2O$: 12.5 to 25%;
$Na_2O$: 0 to 10% (including 0);
$K_2O$: 0 to 10% (including 0);
$Li_2O$+$Na_2O$+$K_2O$: 12.5 to 25%;
SrO: 0 to 10% (including 0);
BaO: 0 to 5% (including 0); and
$Sb_2O_3$: 0 to 1% (including 0).

Hereinafter, "%" means "weight %" unless otherwise noted.

From another aspect of the present invention, an optical element composed of the optical glass is provided. A lens, a prism, and a mirror are preferable as such an optical element.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
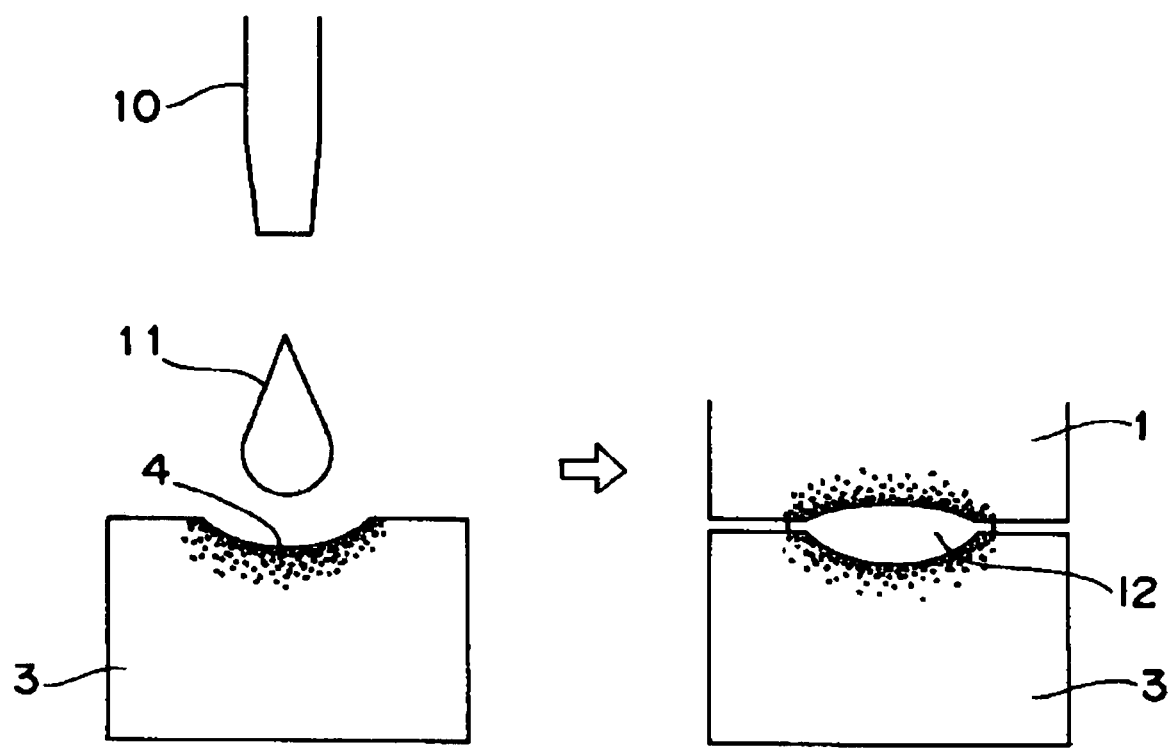
FIG. 1 is a diagram schematically illustrating a method of press-molding a lens.

A reason why components of optical glass of the present invention are selected as described above is explained below. $SiO_2$ is a component (glass former) composing a glass skeleton, and when its content is less than 20%, the durability of the glass is deteriorated. On the other hand, when the content of $SiO_2$ exceeds 45%, devitrification resistance is deteriorated. The content of $SiO_2$ is, therefore, set to 20 to 45%. The more preferable content of $SiO_2$ is in a range of 20 to 40%.

$B_2O_3$ is a component composing the glass skeleton similarly to $SiO_2$, and when the content of $B_2O_3$ is less than 15%, the glass is devitrified easily. On the other hand, when the content exceeds 40%, the durability is deteriorated. The content of $B_2O_3$ is, therefore, set to 15 to 40%. The more preferable content is in a range of 20 to 35%.

$Al_2O_3$ improves the durability of the glass and increases viscosity. When the content of $Al_2O_3$ is less than 4%, the durability of the glass is deteriorated and the viscosity is reduced, thereby making the press molding difficult. On the other hand, when the content of $Al_2O_3$ exceeds 15%, the devitrification resistance and fusibility of the glass are deteriorated. The content of $Al_2O_3$ is, therefore, set to 4 to 15%. The more preferable content of $Al_2O_3$ is in a range of 5% to 13%.

Although MgO improves weight saving and refractive index of the glass, and further reduces dispersion, when its content exceeds 10%, the glass becomes unstable, thereby deteriorating the devitrification resistance. The content of MgO is, therefore, set to 0 to 10% (including 0). The more preferable content of MgO is in a range of 0 to 5%.

CaO improves the weight saving, the refractive index and the durability of the glass. When the content of CaO is less than 13%, a desired optical constant cannot be obtained. On the other hand, when the content exceeds 25%, the glass becomes unstable, thereby deteriorating the devitrification resistance. The content of CaO is, therefore, set to 13 to 25%. The more preferable content of CaO is in a range of 13 to 23%.

When a total amount of MgO and CaO is less than 13%, the refractive index is reduced, and thus the desired optical constant cannot be obtained and further the durability of the glass is deteriorated. On the other hand, when the total amount of MgO and CaO exceeds 25%, the glass becomes unstable, thereby deteriorating devitrification resistance. The total amount of MgO and CaO is, therefore, set to 13 to 25%. The more preferable total amount of MgO and CaO is in a range of 14 to 23%.

$Li_2O$ makes a great effect on the weight saving and low Tg of the glass. When the content of $Li_2O$ is less than 12.5%, the effect cannot be sufficiently obtained. On the other hand, when the content of Li2O exceeds 25%, the durability of the glass becomes quite inadequate, and the refractive index is reduced. As a result, the desired optical constant cannot be obtained, and further the devitrification resistance is deteriorated. The content of $Li_2O$ is, therefore, set to 12.5 to 25%. The more preferable content of $Li_2O$ is in a range of 12.5 to 22%.

Although $Na_2O$ and $K_2O$ are useful components that reduce Tg, when the glass contains more than 10% of $Na_2O$ and $K_2O$, the density becomes large, and the durability of the glass is deteriorated. The contents of $Na_2O$ and $K_2O$ are, therefore, set to 0 to 10% (including 0). The preferable content of $Na_2O$ is in a range of 0 to 8%, and the more preferable content of $K_2O$ is in a range of 0 to 5%.

When a total amount of a $R'_2O$ ($R'$=Li, Na, K) component is less than 12.5%, the effect for reducing Tg cannot be sufficiently obtained. On the other hand, when the total amount of $R'_2O$ component exceeds 25%, the durability is deteriorated and the refractive index is reduced, and thus the desirable optical constant cannot be obtained. The total amount of $R'_2O$ is, therefore, set to 12.5 to 25%. The more preferable total amount of $R'_2O$ is in a range of 12.5 to 22%.

SrO and BaO adjust the refractive index and improve the stability of the glass, but when their contents exceed 10% and 5%, respectively, the density of the glass becomes large. The content of SrO is, therefore, set to 0 to 10% (including 0), and the content of BaO is set to 0 to 5% (including 0).

A small amount of $Sb_2O_3$ improves a clarification function. A content of $SB_2O_3$ is, therefore, set to 0 to 1% (including 0).

Conventionally and publicly known glass components and additives such as ZnO, $TiO_2$, $Y_2O_3$, $Ta_2O_5$, CuO, $Gd_2O_3$, $La_2O_3$, $Bi_2O_3$, $WO_3$, $ZrO_2$ and $GeO_2$ may be naturally added to the optical glass of the present invention as the need arises within a range where the effects of the present invention are not deteriorated.

The optical element of the present invention is manufactured by press-molding the optical glass. Such a press molding method includes a direct press molding method of dropping molten glass to a die which is heated to a predetermined temperature from a nozzle so as to press-mold the optical glass, and a reheating molding method of placing a perform material on a die and heating it to a temperature not less than a glass softening point so as to press-mold the optical glass.

FIG. 1 schematically illustrates the direct press method.

A glass drop 11 is dropped onto a molding surface 4 of a lower die 3 from a nozzle 10. Thereafter, the glass drop 11 is press-molded by an upper die 1 and the lower die 3 so that a lens 12 is obtained. With the press molding, polishing and grinding steps are not necessary, thereby improving productivity. Further, an optical element having a shape such as free-form surface and an aspheric surface which has difficulty to be worked can be obtained.

A molding condition varies with glass components and shapes of a molded product, but in general a molding temperature is preferably in a range of 350 to 600° C., and a temperature range which is close to a glass transition temperature is most preferable. Press time is preferably in a range of a several seconds to several tens of seconds. Further, a press pressure is preferably in a range of 200 kgf/$cm^2$ to 600 kgf/$cm^2$ according to a shape and size of the lens, and as the lens is pressed at a higher pressure, the molding is more accurate. Viscosity of the glass at the time of molding is preferably in a range of $10^1$ to $10^{12}$ poise.

The optical element of the present invention can be used as a lens of a digital camera, or a collimating lens, a prism or a mirror of a laser beam printer, for example.

Examples of the present invention are explained below more concretely. It is to be noted that the present invention is not limited to these examples.

Examples 1 to 12 are described in Tables 1 and 2, and comparative examples 1 to 7 are described in Tables 3 and 4. In the examples 1 to 12 and the comparative examples 1 to 7, general glass raw materials such as oxide, carbonate and nitrate were used to be prepared so that the target compositions in Tables 1 to 4 were obtained, and the powder was mixed sufficiently so that the prepared raw material was obtained. The prepared raw material was put into a melting furnace heated to 1,000 to 1,300° C., and after it was molten and clarified, it was agitated to be homogenized and founded into a mold made of iron or carbon which was heated in advance and slowly cooled, so that respective samples were manufactured. Refractive index (nd), Abbe number (vd), gravity (ρ), glass transition temperature (Tg) and deformation temperature (At) of the samples with respect to a line d were measured. The measured results are shown in Tables 1 to 4.

The comparative example 1 is a replicated result of the example 8 in U.S. Pat. No. 5,744,409 mentioned above, the comparative example 2 is a replicated result of the example 5 in Japanese Patent Application Laid-Open No. 60-36348, and the comparative example 3 is a replicated result of the example 5 in Japanese Patent Application Laid-Open No. 60-122747. The comparative example 4 is a replicated result of the example 11 in Japanese Patent Application Laid-Open No. 2003-89543, the comparative example 5 is a replicated result of the example 5 in Japanese Patent Application Laid-Open No. 2000-302479, and the comparative example 6 is a replicated result of the example 11 in U.S. Pat. No. 5,919,718.

The above physical properties were measured based on the test method of Japan Optical Glass Industry Standard (JOGIS). The refractive index (nd) and the Abbe number (vd) means values when the raw materials are slowly cooled at −30° C./time. The measurements were taken by using "KPR-200" produced by Kalnew Optical Industrial Co., Ltd. The glass transition temperature (Tg) and the deformation temperature (At) were measured by using the thermomechanical analyzer "TMA/SS6000" produced by Seiko Instruments Inc. under a condition that the temperature is raised by 10° C. per minute.

As is clear from Tables 1 and 2, the optical glass of the examples 1 to 12 which has small density of not more than 2.73 and Tg of not more than 480° C. is suitable for the press molding. As a result, the optical glass in the examples 1 to 12 satisfies the conditions of low density and low Tg. On the contrary, as is clear from Tables 3 and 4, the optical glass in the comparative examples 1 and 3 to 6 has large density of not less than 2.78 g/cm$^3$. Further, the optical glass in the comparative examples 1 to 4 and 6 which has high Tg of not less than 497° C. is not suitable for the press molding. In the optical glass in the comparative example 7, since the content of Li$_2$O was 28.0%, namely, too large, the glass was devitrified during melting.

As mentioned above, when the optical glass in the examples 1 to 12 was allowed to contain a specified amount of predetermined glass components, the intermediate refractive index, the low dispersion and the low density could be achieved without using compounds of lead and arsenic which have bad effects on the human body. Further, since Tg is low, the excellent press molding properties can be obtained.

Since the optical element according to the embodiments is manufactured by press-molding the above-described optical glass, it has the properties of the optical glass as described above, and further the production efficiency is high and the cost can be reduced.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

TABLE 1

| | Example | Example 2 | Example 3 | Example 4 | Example 5 | Example 6 (unit: wt %) |
|---|---|---|---|---|---|---|
| SiO$_2$ | 35.0 | 25.0 | 30.0 | 25.0 | 20.0 | 32.0 |
| B$_2$O$_3$ | 25.0 | 35.0 | 30.0 | 33.0 | 30.0 | 18.0 |
| Al$_2$O$_3$ | 5.0 | 5.0 | 5.0 | 5.0 | 12.0 | 10.0 |
| Li$_2$O | 15.0 | 15.0 | 15.0 | 15.0 | 20.0 | 17.0 |
| Na$_2$O | | | | | | |
| K$_2$O | | | | | | |
| Li$_2$O + Na$_2$O + K$_2$O | 15.0 | 15.0 | 15.0 | 15.0 | 20.0 | 17.0 |
| MgO | 3.0 | 6.0 | 3.0 | 6.0 | 4.0 | 3.0 |
| CaO | 17.0 | 14.0 | 17.0 | 16.0 | 14.0 | 20.0 |
| MgO + CaO | 20.0 | 20.0 | 20.0 | 22.0 | 18.0 | 23.0 |
| SrO | | | | | | |
| BaO | | | | | | |
| Refractive index (nd) | 1.594 | 1.594 | 1.592 | 1.596 | 1.590 | 1.596 |
| Abbe number (vd) | 59.8 | 59.9 | 61.1 | 59.4 | 57.3 | 56.9 |
| Density (ρ) | 2.58 | 2.55 | 2.57 | 2.56 | 2.48 | 2.54 |
| Glass transition temperature (Tg) | 460 | 457 | 461 | 445 | 398 | 4.19 |
| Deformation temperature (At) | 496 | 494 | 497 | 483 | 431 | 458 |

TABLE 2

| | Example | Example 8 | Example 9 | Example 10 | Example 11 | Example 12 |
|---|---|---|---|---|---|---|
| SiO$_2$ | 20.0 | 25.0 | 25.0 | 25.0 | 20.0 | 25.0 |
| B$_2$O$_3$ | 30.0 | 25.0 | 35.0 | 25.0 | 30.0 | 25.0 |
| Al$_2$O$_3$ | 12.0 | 12.0 | 5.0 | 10.0 | 4.0 | 4.0 |
| Li$_2$O | 15.0 | 15.0 | 13.0 | 20.0 | 13.0 | 13.0 |
| Na$_2$O | 3.0 | | 2.0 | | 1.0 | 1.0 |
| K$_2$O | | 3.0 | | | | |
| Li$_2$O + Na$_2$O + K$_2$O | 18.0 | 18.0 | 15.0 | 20.0 | 14.0 | 14.0 |
| MgO | 5.0 | 5.0 | 0.2 | 3.0 | 0.2 | 0.2 |
| CaO | 15.0 | 15.0 | 15.8 | 14.0 | 24.8 | 21.8 |
| MgO + CaO | 20.0 | 20.0 | 16.0 | 17.0 | 25.0 | 22.0 |
| SrO | | | 2.0 | | 4.5 | 7.5 |

TABLE 2-continued

|  | Example | Example 8 | Example 9 | Example 10 | Example 11 | Example 12 |
|---|---|---|---|---|---|---|
| BaO |  |  | 2.0 | 3.0 | 2.5 | 2.5 |
| Refractive index (nd) | 1.588 | 1.586 | 1.593 | 1.592 | 1.609 | 1.608 |
| Abbe number (vd) | 57.8 | 57.6 | 60.3 | 56.7 | 57.2 | 56.9 |
| Density (ρ) | 2.52 | 2.53 | 2.61 | 2.53 | 2.69 | 2.73 |
| Glass transition temperature (Tg) | 408 | 418 | 452 | 395 | 416 | 420 |
| Deformation temperature (At) | 446 | 457 | 493 | 427 | 452 | 458 |

TABLE 3

|  | Comparative Example 1 | Comparative Example 2 | Comparative Example 3 | Comparative Example 4 |
|---|---|---|---|---|
|  |  |  |  | (unit: wt %) |
| $SiO_2$ | 50.7 | 28.0 | 45.8 | 39.8 |
| $B_2O_3$ | 13.4 | 32.0 | 12.0 | 17.5 |
| $Al_2O_3$ | 3.6 | 9.0 | 4.0 | 1.5 |
| $Li_2O$ | 7.4 | 4.0 | 5.0 | 6.6 |
| $Na_2O$ | 1.0 |  | 5.0 | 2.1 |
| $K_2O$ | 3.4 |  |  |  |
| $Li_2O + Na_2O + K_2O$ | 11.8 | 4.0 | 10.0 | 8.7 |
| MgO |  |  |  | 6.5 |
| CaO |  | 27.0 | 20.0 |  |
| MgO + CaO | 0.0 | 27.0 | 20.0 | 6.5 |
| SrO |  |  |  | 2.1 |
| BaO | 16.5 |  |  | 7.8 |
| ZnO | 2.0 |  | 8.0 |  |
| $La_2O_3$ | 2.0 |  |  | 17.0 |
| $Gd_2O_3$ |  |  |  |  |
| $ZrO_2$ |  |  |  |  |
| Refractive index (nd) | 1.590 | 1.604 | 1.591 | 1.571 |
| Abbe number (vd) | 61.6 | 60.6 | 57.0 | 57.2 |
| Density (ρ) | 2.84 | 2.68 | 2.78 | 3.02 |
| Glass transition temperature (Tg) | 497 | 560 | 506 | 517 |
| Deformation temperature | 548 | 601 | 551 | 564 |

TABLE 4

|  | Comparative Example 5 | Comparative Example 6 | Comparative Example 7 |
|---|---|---|---|
| $SiO_2$ | 43.0 | 38.2 | 28.0 |
| $B_2O_3$ | 10.5 | 24.0 | 20.0 |
| $Al_2O_3$ | 2.5 | 5.5 | 5.0 |
| $Li_2O$ | 9.0 | 8.0 | 28.0 |
| $Na_2O$ | 4.5 |  |  |
| $K_2O$ |  |  |  |
| $Li_2O + Na_2O + K_2O$ | 13.5 | 8.0 | 28.0 |
| MgO |  |  | 4.0 |
| CaO | 11.5 | 7.3 | 15.0 |
| MgO + CaO | 11.5 | 7.3 | 19.0 |
| SrO | 8.5 |  |  |
| BaO | 6.0 | 12.6 |  |
| ZnO | 1.0 |  |  |
| $La_2O_3$ | 1.0 | 4.1 |  |
| $Gd_2O_3$ | 2.0 |  |  |
| $ZrO_2$ | 0.5 |  |  |
| Refractive index (nd) | 1.604 | 1.589 |  |
| Abbe number (vd) | 59.7 | 61.3 |  |
| Density ρ) | 2.88 | 2.82 | Devitrified |
| Glass transition temperature | 460 | 522 |  |
| Deformation temperature | 508 | 565 |  |

What is claimed is:

1. An optical glass, wherein the optical glass fails to include $La_2O_3$ and includes the following components:
   $SiO_2$: 20 to 45% by weight;
   $B_2O_3$: 15 to 40% by weight;
   $Al_2O_3$: 4 to 15% by weight;
   MgO: 0 to 10% (including 0) by weight;
   CaO: 13 to 25% by weight;
   MgO+CaO: 13 to 25% by weight;
   $Li_2O$: 12.5 to 25% by weight;
   $Na_2O$: 0 to 10% (including 0) by weight;
   $K_2O$: 0 to 10% (including 0) by weight;
   $Li_2O+Na_2O+K_2O$: 12.5 to 25% by weight;
   SrO: 0 to 10% (including 0) by weight;
   BaO: 0 to 5% (including 0) by weight; and
   $Sb_2O_3$: 0 to 1% (including 0) by weight.

2. An optical glass according to claim 1, wherein the refractive index of the optical glass is in a range of 1.56 to 1.63.

3. An optical glass according to claim 1, wherein the Abbe number of the optical glass is in a range of 56 to 63.

4. An optical glass according to claim 1, wherein the density of the optical glass is not more than 2.75 g/cm$^3$.

5. An optical glass according to claim 1, wherein the glass transition temperature of the optical glass is not more than 480° C.

6. An optical element made from an optical glass, wherein the optical glass fails to include $La_2O_3$ and includes the following components:
   $SiO_2$: 20 to 45% by weight;
   $B_2O_3$: 15 to 40% by weight;
   $Al_2O_3$: 4 to 15% by weight;
   MgO: 0 to 10% (including 0) by weight;
   CaO: 13 to 25% by weight;
   MgO+CaO: 13 to 25% by weight;
   $Li_2O$: 12.5 to 25% by weight;
   $Na_2O$: 0 to 10% (including 0) by weight;
   $K_2O$: 0 to 10% (including 0) by weight;
   $Li_2O+Na_2O+K_2O$: 12.5 to 25% by weight;
   SrO: 0 to 10% (including 0) by weight;
   BaO: 0 to 5% (including 0) by weight; and
   $Sb_2O_3$: 0 to 1% (including 0) by weight.

7. An optical element according to claim 6, wherein the refractive index of the optical glass is in a range of 1.56 to 1.63.

8. An optical element according to claim 6, wherein the Abbe's number of the optical glass is in a range of 56 to 63.

9. An optical element according to claim 6, wherein the density of the optical glass is not more than 2.75 g/cm$^3$.

10. An optical element according to claim 6, wherein the glass transition temperature of the optical glass is not more than 480° C.

11. An optical element according to claim 6, wherein the optical element is manufactured by a method in which a glass is pressed by a molding die.

12. An optical element according to claim 11, wherein the temperature of the molding die is in a range of 350 to 600° C.

13. An optical element according to claim 11, wherein a pressing pressure applied by the molding die is in a range of 200 to 600 kgf/cm$^2$.

14. An optical element according to claim 11, wherein the viscosity of the glass at a time when the glass is pressed by the die is in a range of 10$^1$ to 10$^{12}$ poise.

15. An optical glass, wherein the optical glass fails to include Y$_2$O$_3$ and includes the following components:
   SiO$_2$: 20 to 45% by weight;
   B$_2$O$_3$: 15 to 40% by weight;
   Al$_2$O$_3$: 4 to 15% by weight;
   MgO: 0 to 10% (including 0) by weight;
   CaO: 13 to 25% by weight;
   MgO+CaO: 13 to 25% by weight;
   Li$_2$O: 12.5 to 25% by weight;
   Na$_2$O: 0 to 10% (including 0) by weight;
   K$_2$O: 0 to 10% (including 0) by weight;
   Li$_2$O+Na$_2$O+K$_2$O: 12.5 to 25% by weight;
   SrO: 0 to 10% (including 0) by weight;
   BaO: 0 to 5% (including 0) by weight; and
   Sb$_2$O$_3$: 0 to 1% (including 0) by weight.

16. An optical glass according to claim 15, wherein the refractive index of the optical glass is in a range of 1.56 to 1.63.

17. An optical glass according to claim 15, wherein the Abbe number of the optical glass is in a range of 56 to 63.

18. An optical glass according to claim 15, wherein the density of the optical glass is not more than 2.75 g/cm$^3$.

19. An optical glass according to claim 15, wherein the glass transition temperature of the optical glass is not more than 480° C.

20. An optical element made from an optical glass, wherein the optical glass fails to include Y$_2$O$_3$ and includes the following components:
   SiO$_2$: 20 to 45% by weight;
   B$_2$O$_3$: 15 to 40% by weight;
   Al$_2$O$_3$: 4 to 15% by weight;
   MgO: 0 to 10% (including 0) by weight;
   CaO: 13 to 25% by weight;
   MgO+CaO: 13 to 25% by weight;
   Li2O: 12.5 to 25% by weight;
   Na2O: 0 to 10% (including 0) by weight;
   K2O: 0 to 10% (including 0) by weight;
   Li$_2$O+Na$_2$O+K$_2$O: 12.5 to 25% by weight;
   SrO: 0 to 10% (including 0) by weight;
   BaO: 0 to 5% (including 0) by weight; and
   Sb$_2$O$_3$: 0 to 1% (including 0) by weight.

21. An optical element according to claim 20, wherein the refractive index of the optical glass is in a range of 1.56 to 1.63.

22. An optical element according to claim 20, wherein the Abbe's number of the optical glass is in a range of 56 to 63.

23. An optical element according to claim 20, wherein the density of the optical glass is not more than 2.75 g/cm$^3$.

24. An optical element according to claim 20, wherein the glass transition temperature of the optical glass is not more than 480° C.

25. An optical element according to claim 20, wherein the optical element is manufactured by a method in which a glass is pressed by a molding die.

26. An optical element according to claim 25, wherein the temperature of the molding die is in a range of 350 to 600° C.

27. An optical element according to claim 25, wherein a pressing pressure applied by the molding die is in a range of 200 to 600 kgf/cm$^2$.

28. An optical element according to claim 25, wherein the viscosity of the glass at a time when the glass is pressed by the die is in a range of 10$^1$ to 10$^{12}$ poise.

* * * * *

UNITED STATES PATENT AND TRADEMARK OFFICE
CERTIFICATE OF CORRECTION

| | | |
|---|---|---|
| PATENT NO. | : 7,541,302 B2 | Page 1 of 1 |
| APPLICATION NO. | : 11/104788 | |
| DATED | : June 2, 2009 | |
| INVENTOR(S) | : Manabu Izuki | |

It is certified that error appears in the above-identified patent and that said Letters Patent is hereby corrected as shown below:

On the Title Page

Item (75), replace "Kobe" with --Kobe-shi--.

In the Claims

In column 10, claim 20, line 13, replace "Li2O" with --$Li_2O$--.

In column 10, claim 20, line 14, replace "Na2O" with --$Na_2O$--.

In column 10, claim 20, line 15, replace "K2O" with --$K_2O$--.

Signed and Sealed this

Twenty-second Day of September, 2009

David J. Kappos
*Director of the United States Patent and Trademark Office*